US012580100B1

(12) United States Patent
Jin Stone et al.

(10) Patent No.: US 12,580,100 B1
(45) Date of Patent: Mar. 17, 2026

(54) THERMAL MEASUREMENTS USING SUPERCONDUCTING MATERIALS

(71) Applicant: PsiQuantum Corp., Palo Alto, CA (US)

(72) Inventors: Qiaodan Jin Stone, Sunnyvale, CA (US); Gary Gibson, Palo Alto, CA (US)

(73) Assignee: PSIQUANTUM CORP., Palo Alto, CA (US)

( * ) Notice: Subject to any disclaimer, the term of this patent is extended or adjusted under 35 U.S.C. 154(b) by 58 days.

(21) Appl. No.: 18/378,116

(22) Filed: Oct. 9, 2023

Related U.S. Application Data

(62) Division of application No. 17/061,448, filed on Oct. 1, 2020, now Pat. No. 11,783,967.

(60) Provisional application No. 62/910,336, filed on Oct. 3, 2019.

(51) Int. Cl.
*H01B 12/06* (2006.01)
*H01B 12/16* (2006.01)

(52) U.S. Cl.
CPC ............ *H01B 12/06* (2013.01); *H01B 12/16* (2013.01)

(58) Field of Classification Search
CPC ...................................................... H01B 12/06
See application file for complete search history.

(56) References Cited

U.S. PATENT DOCUMENTS 11,783,967 B1 10/2023 Stone et al.
2008/0048762 A1* 2/2008 Inamdar ................ H03K 17/92 327/528
2014/0087950 A1 3/2014 Isojima et al.
2016/0087427 A1 3/2016 Yang et al.
2016/0209497 A1 7/2016 Habif
2019/0044542 A1* 2/2019 Hogaboam ............ G06N 3/088

OTHER PUBLICATIONS

Allmaras, et al., "Thin-Film Thermal Conductivity Measurements Using Superconducting Nanowires," Journal of Low Temperature Physics, Jul. 24, 2018, 7 pgs.
Swartz et al., "Thermal resistance at interfaces," Appl. Phys. Lett., vol. 51, No. 26, Dec. 28, 1987, 4 pgs.
Stone et al., Non-Final Office Action, U.S. Appl. No. 17/061,448, Oct. 27, 2022, 10 pgs.
Stone et al., Notice of Allowance, U.S. Appl. No. 17/061,448, Jun. 12, 2023, 5 pgs.

* cited by examiner

*Primary Examiner* — Paul A Wartalowicz
(74) *Attorney, Agent, or Firm* — Morgan, Lewis & Bockius LLP

(57) ABSTRACT

An example method described herein includes operating a first component of a circuit. The method also includes, while operating the first component, supplying a current to a superconducting wire that is thermally-coupled to the first component, and determining whether the superconducting wire has transitioned between a superconducting state to a non-superconducting state in response to the current. The method further includes measuring a temperature of the first component based on whether the superconducting wire transitioned between the superconducting state to the non-superconducting state in response to the current, and adjusting operation of the first component in accordance with a determination that the temperature exceeds a predetermined threshold temperature.

19 Claims, 8 Drawing Sheets

THERMAL MEASUREMENTS USING SUPERCONDUCTING MATERIALS

RELATED APPLICATIONS

This application is a divisional of U.S. application Ser. No. 17/061,448, filed Oct. 1, 2020, entitled "Thermal Measurements Using Superconducting Materials," which claims priority to U.S. Provisional Application Ser. No. 62/910,336, filed Oct. 3, 2019, each of which is hereby incorporated by reference in its entirety.

TECHNICAL FIELD

The present disclosure relates generally to performing thermal measurements using superconducting materials (e.g., by determining when superconducting materials transition between a superconducting and a non-superconducting state).

BACKGROUND

Some electronic and optical circuit components perform operations with temperature-dependent efficiencies. For example, some electronic and optical circuit components perform quantum operations (e.g., quantum computing operations such as quantum key distribution, quantum computing protocols based on teleportation, quantum communication, and the like) using photons. Certain photon detectors used in such systems have detection efficiencies that are temperature-dependent.

Thus, there is a need for systems and methods that measure the temperature of electronic and optical components and perform load balancing on such components based on their temperature.

SUMMARY

The present disclosure provides systems and methods that measure the temperature and/or thermal properties (e.g., thermal conductivity) of electronic and optical components using superconducting materials. In some embodiments, a superconducting wire is disposed near, and thermally-coupled with, a heat-producing circuit component (e.g., with a temperature-dependent efficiency). The temperature of the heat-producing circuit component is measured (e.g., inferred) from a threshold superconducting current for the superconducting wire. In some embodiments, the threshold superconducting current is the hotspot current, which depends more strongly on the thermal properties of the device than the critical current. In some embodiments, the superconducting wire is spaced more than a mean free path of phonons from the device, so as to better probe the bulk thermal properties of the device.

To that end, some embodiments of the present disclosure provide a circuit. The circuit includes a first component and a plurality of superconducting wires thermally-coupled to the first component. The superconducting wires of the plurality of superconducting wires are arranged and configured such that a threshold superconducting current for each superconducting wire is dependent on an amount of heat received from the first component. The circuit further includes a dielectric material separating the plurality of superconducting wires from one another. A superconducting wire nearest the first component among the plurality of superconducting wires is more than a phonon mean free path of the dielectric material from the first component. The circuit further includes control circuitry electrically-coupled to the plurality of superconducting wires. The control circuitry is configured to provide current to each of the plurality of superconducting wires.

Further, some embodiments of the present disclosure provide a method of operating a first component of a circuit. The method includes, while operating the first component, supplying a current to a superconducting wire that is thermally-coupled to the first component. The method further includes determining whether the superconducting wire has transitioned between a superconducting state to a non-superconducting state in response to the current. The method further includes measuring a temperature of the first component based on whether the superconducting wire transitioned between the superconducting state to the non-superconducting state in response to the current. The method further includes adjusting operation of the first component in accordance with a determination that the temperature exceeds a predetermined threshold temperature.

Thus, devices and circuits are provided with methods for measuring the temperature of electronic and optical components and for performing load balancing based on temperature, thereby increasing the effectiveness and efficiency of such circuits and devices. In some circumstances, the devices and circuits provided herein a capable of measuring low temperatures (e.g., below a threshold temperature of superconducting wires), where other temperature monitoring techniques have difficulties.

BRIEF DESCRIPTION OF THE DRAWINGS

For a better understanding of the various described embodiments, reference should be made to the Detailed Description below, in conjunction with the following drawings in which like reference numerals refer to corresponding parts throughout the figures.

DETAILED DESCRIPTION

Figure 1:
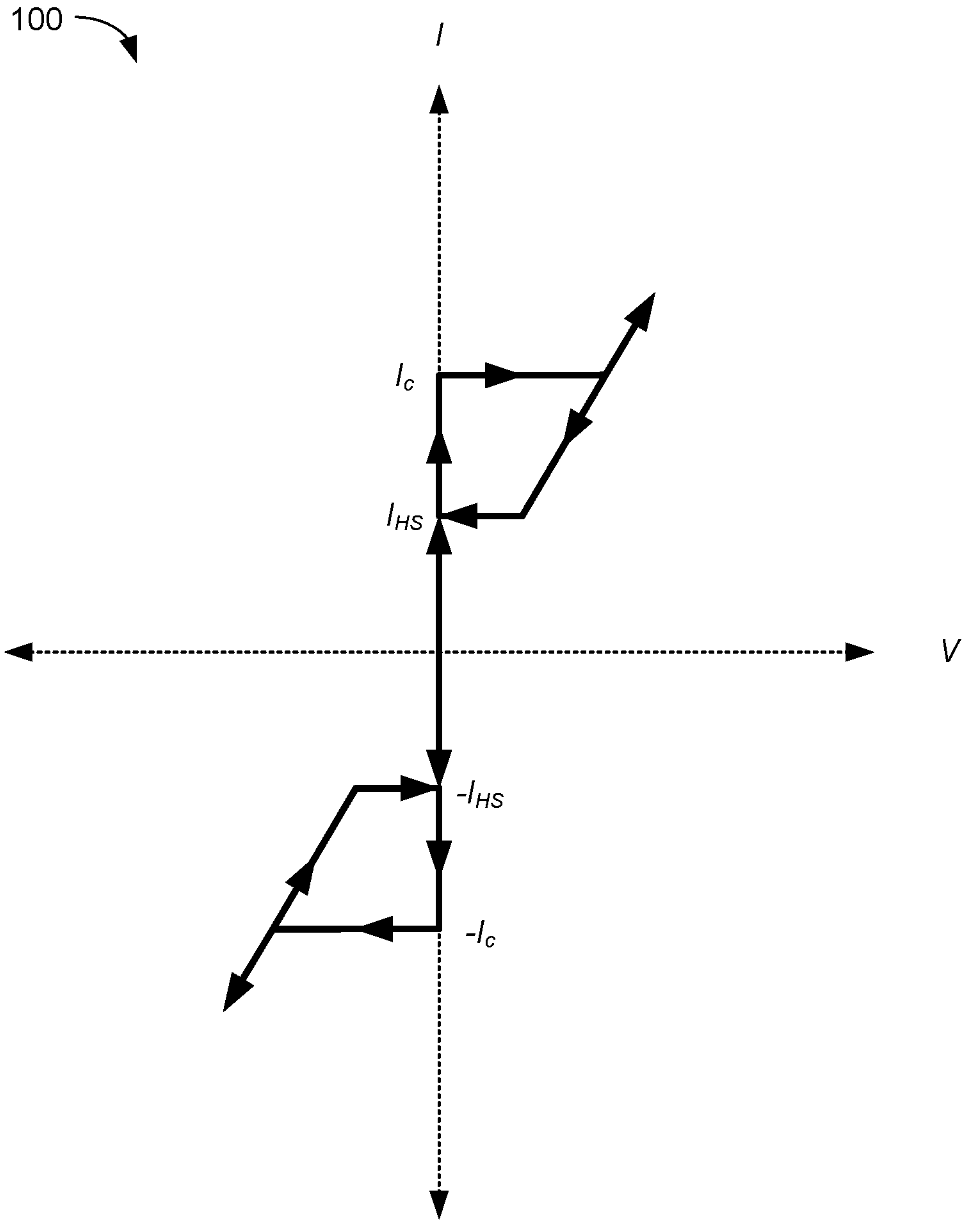
FIG. 1 is a graph illustrating an exemplary relationship between a superconducting wire's critical current and its hotspot current, in accordance with some embodiments.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

Many modifications and variations of this disclosure can be made without departing from its spirit and scope, as will be apparent to those skilled in the art. The specific embodiments described herein are offered by way of example only, and the disclosure is to be limited only by the terms of the appended claims, along with the full scope of equivalents to which such claims are entitled.

As used herein, a "superconducting circuit" or "superconductor circuit" is a circuit having one or more superconducting materials. For example, a superconductor switch circuit is a switch circuit that includes one or more superconducting materials. As used herein, a "superconducting" material is a material that is capable of operating in a superconducting state (under particular conditions). For example, a superconducting material is a material that operates as a superconductor (e.g., operates with zero DC electrical resistance) when cooled below a particular temperature (e.g., a threshold temperature) and having less than a threshold current at that temperature flowing through it. A superconducting material is also sometimes called a superconduction-capable material. In some embodiments, the superconducting materials can operate in a non-superconducting state during which the materials have a non-zero electrical resistance (e.g., a resistance in the range of one thousand to ten thousand ohms). For example, a superconducting material supplied with a current greater than a threshold superconducting current for the superconducting material transitions from a superconducting state having zero electrical resistance to a non-superconducting state having non-zero electrical resistance.

As used herein, a "wire" is a section of material configured for transferring electrical current. In some embodiments, a wire includes a section of material conditionally capable of transferring electrical current, e.g., a wire made of a superconducting material that is capable of transferring electrical current while the wire is maintained at a temperature below a threshold temperature (e.g., significantly more current than when the wire is maintained at a temperature above the threshold temperature). As another example, a wire made of semiconducting material is capable of transferring electrical current while the wire is maintained at a temperature above a freeze-out temperature. A cross-section of a wire (e.g., a cross-section that is perpendicular to a length of the wire) optionally has a regular (e.g., flat or round) shape or an irregular shape. While some of the figures show wires having rectangular shapes, any shape could be used. In some embodiments, a length of a wire is greater than a width or a thickness of the wire (e.g., the length of a wire is at least 5, 6, 7, 8, 9, or 10 times greater than the width and the thickness of the wire). In some cases, a wire is a section of a superconducting layer.

FIG. 1 is a graph 100 illustrating an exemplary relationship between a superconducting wire's critical current and its hotspot current, in accordance with some embodiments. In the example illustrated by graph 100, it is assumed that the superconducting wire is disposed on a substrate (e.g., any of the substrates described herein) that is maintained below a critical temperature of the superconducting wire with little or no applied magnetic field.

The vertical axis of graph 100 represents a DC electrical current I applied along the superconducting wire. The horizontal axis of graph 100 represents a voltage drop V' across a superconducting wire resulting from the electrical current I (e.g., a voltage drop in the direction of the electrical current I). Starting from a current of zero and increasing to a critical current $I_c$, zero voltage drop is produced across the superconducting wire, reflecting the fact that the superconducting wire remains in a superconducting state below its critical current. The critical current depends on the material composition of the superconducting wire, its size and shape, and other factors, as well as defects in these factors (e.g. shape defects).

Once the critical current is reached, however, the superconducting wire transitions from a superconducting state to a non-superconducting state (e.g., abruptly, in a phase transition). In the non-superconducting state (e.g., a resistive or insulating state), the superconducting wire has a non-zero resistance and thus the voltage drop V across the superconducting wire is dependent (e.g., linearly, per Ohm's law) on the current I across the superconducting wire.

Starting from above the critical current, as the current is lowered, in some circumstances, the superconducting wire remains in a non-superconducting state even below the critical current $I_c$. Note that the critical current in FIG. 1 (and throughout this disclosure, unless stated otherwise) corresponds to the critical current at the original ambient temperature (e.g., the temperature of the superconducting wire when the superconducting wire was in the superconducting state, and thus in the absence of self-heating). This hysteresis results from the fact that, in the non-superconducting state, resistive heat is generated by the application of the current across the superconducting wire. The resistive heat raises the temperature of the superconducting wire and concomitantly lowers the current at which the superconducting wire transitions from the non-superconducting state to the superconducting state, referred to herein as the hotspot current $I_{HS}$. As a result, the hotspot current $I_{HS}$ is largely dependent on the thermal dissipation properties of the superconducting wire (e.g., which depend, in turn, on thermal coupling between the superconducting wire and for example, the substrate). In some circumstances, the hotspot current is more easily and precisely controlled than the critical current, which, as noted above, may depend on defects that are difficult to control or avoid. Note that, when the magnitude of the current is changed slowly such that the superconducting wire remains in or near thermal equilibrium, the hotspot current is sometimes referred to as a "steady-state" hotspot current.

In some circumstances, when the magnitude of the current is changed quickly, such that the superconducting wire is not in or near thermal equilibrium, a more pronounced hysteresis is observed. For example, as the current is ramped down, the superconducting wire remains in a non-superconducting state further below the critical current $I_c$ as compared to the steady-state case. Stated another way, in some circumstances, the non-steady-state hot spot current is lower than the steady-state hot spot current.

Note that, as can be seen from the negative voltage and negative current portion of the graph 100, the state of the superconducting wire (e.g., superconducting or non-superconducting state) is dependent on the magnitude of the applied current. Thus, graph 100 is symmetric.

Figure 2A:
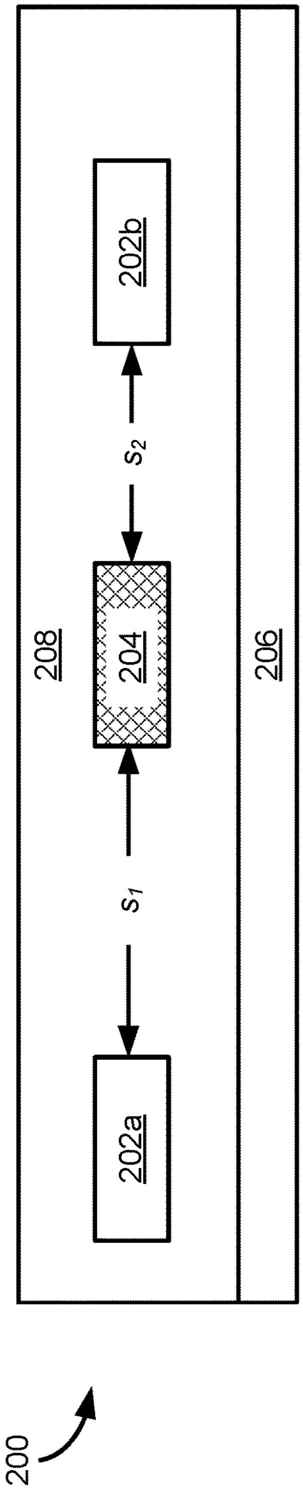
FIGS. 2A-2C are diagrams illustrating superconducting circuits, in accordance with some embodiments.
Figure 2B:
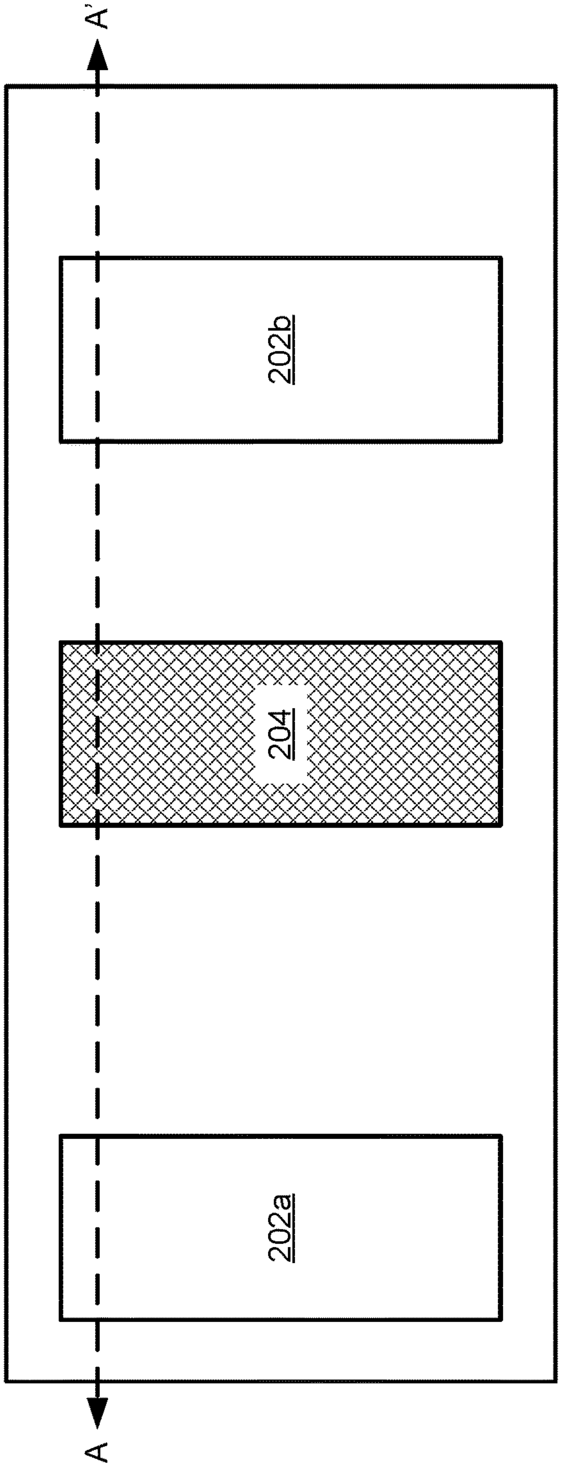

FIGS. 2A-2B are diagrams of a superconducting circuit 200, in accordance with some embodiments. In particular, FIG. 2A illustrates a vertical cross-section of the superconducting circuit 200, while FIG. 2B illustrates a horizontal cross-section of the superconducting circuit 200, sometimes called a plan view. Plane AA', shown in FIG. 2B, represents the relationship between the vertical and horizontal cross-sections of the superconducting circuit 200.

Superconducting circuit 200 includes a first component 204. In some embodiments, the first component 204 is a non-superconducting component (e.g., a resistive component, such as a resistive wire). In some embodiments, the first component 204 is a superconducting component (e.g., a superconducting wire) operating in a non-superconducting state (e.g., a superconducting material operating at temperatures and/or currents that exceed superconducting thresholds).

In some embodiments, the superconducting circuit 200 is disposed on a substrate 206 (e.g., a silicon substrate). In some embodiments, in use, at least a portion of the substrate 206 is maintained at cryogenic temperatures (e.g., temperatures below the superconducting threshold temperatures of any of the superconducting components used in superconducting circuit 200).

Superconducting circuit 200 includes a plurality of superconducting wires 202 thermally-coupled to the first component 204 (e.g., superconducting wire 202*a* and superconducting wire 202*b*). In some embodiments, each superconducting wire of the plurality of superconducting wires 202 has a same surface area (e.g., to remove size-dependent variables and cancel out contact resistances). In some embodiments, each superconducting wire of the plurality of superconducting wires 202 is substantially identical to the others (e.g., except for defects and manufacturing tolerances).

The superconducting wires 202 are arranged and configured such that a threshold superconducting current (e.g., a critical current $I_c$ or hotspot current $I_{HS}$) for each superconducting wire 202 is dependent on an amount of heat received from the first component 204. Thus, by measuring the threshold superconducting current for each superconducting wire 202 (e.g., determining a respective current at which the superconducting wire 202 transitions between a superconducting state and a non-superconducting state), a temperature of the first component 204 can be determined (e.g., once a relationship between the threshold superconducting currents and the temperature of the first component 204 has been established).

To that end, in some embodiments, superconducting wires 202 are electrically-coupled to control circuitry (e.g., control circuitry 606, FIG. 6) that is configured to provide current to each of the plurality of superconducting wires 202. In some embodiments, the control circuitry is also configured to determine the respective current at which the superconducting wire transitions between a superconducting state and a non-superconducting state. In some embodiments, the superconducting wires 202 are coupled to the control circuitry using contacts and/or vias, not shown. In some embodiments, at least a portion of the control circuitry is integrated on the same substrate as the superconducting wires 202 (e.g., substrate 206).

In some embodiments, the determined respective current is the hotspot current Ius (e.g., the respective current corresponds to the superconducting wire 202 transitioning from the non-superconducting state to the superconducting state). In some embodiments, the threshold superconducting current is the lowest current that causes a state change from a non-superconducting to a superconducting state. In some circumstances, the hotspot current $I_{HS}$ is a more accurate metric for measuring temperature than the critical current $I_c$ because (i) it is a more direct measure of the substrate's ability to cool, and (ii) less prone to layout-based noise (e.g., sharp corners causing current crowding). Furthermore, in some circumstances, measurements of the critical current $I_c$ may be more prone to errors arising from noise and ripples in the supply current.

Alternatively, the determined respective current is the critical current $I_c$ (e.g., the respective current corresponds to the superconducting wire 202 transitioning from the superconducting state to the non-superconducting state). In some embodiments, the threshold superconducting current is the highest current that causes a state change from superconducting to a non-superconducting state. In some circumstances, the critical current $I_c$ is better than the hotspot current $I_{HS}$ because such a measurement requires less power dissipation by the superconducting wires 202. Furthermore, in some circumstances, the critical current $I_c$ more accurately corresponds to the ambient temperature (rather than the self-heated temperature) because no self-heating occurs before the current reaches the critical current $I_c$.

In some embodiments, each superconducting wire of the plurality of superconducting wires 202 is a distinct distance from the first component 204 (e.g., to be able to obtain distance-based heat data for a mapping or the like). For example, superconducting wire 202*a* is spaced a distance $s_1$ from first component 204 and superconducting wire 202*b* is spaced a distance $s_2$ from first component 204.

Superconducting circuit 200 further includes a dielectric material 208 separating the plurality of superconducting wires 202 from one another. In some embodiments, the dielectric material is native to the substrate 206 (e.g., a native oxide or nitride grown on the substrate 206). In some embodiments, the substrate is a silicon (Si) substrate and the dielectric material is silicon dioxide ($SiO_2$). In some embodiments, the superconducting wires 202 are arranged to be more than a phonon mean free path of the dielectric material 208 (i.e., the mean free path of phonons in dielectric material 208) from one another (e.g., a distance between individual superconducting wires 202 is more than the phonon mean free path of the dielectric). In some embodiments, the superconducting wires 202 are positioned or spaced more than the phonon mean free path of the dielectric material 208 from the first component 204.

In some embodiments, the superconducting wires 202 are arranged to be more than an electron mean free path of the dielectric material 208 from one another. In some embodiments, the superconducting wires 202 are more than the electron mean free path of the dielectric material 208 from the first component 204 (e.g., a superconducting wire 202 nearest the first component 204 among the plurality of superconducting wires is more than a phonon mean free path of the dielectric material from the first component).

In some embodiments, a respective superconducting wire of the plurality of superconducting wires 202 comprises a multi-use component (e.g., a component configured to measure and/or monitor a local temperature of a device and perform an alternative operation, distinct from measuring and/or monitoring the local temperature of the device). In some embodiments, the alternative operation does not measure a thermal property of the device. For example, in some embodiments, one or more respective superconducting wires of the plurality of superconducting wires 202 comprises a photon detection component (e.g., a superconducting nanowire single photon detector (SNSPD)). Thus, in some embodiments, an SNSPD can be used to monitor the temperature of the circuit when the SNSPD is not being used to detect photons. To that end, in some embodiments, each superconducting wire of the plurality of superconducting wires 202 is coupled (or alternatively, one or more of the plurality of superconducting wires 202 are individually coupled) with photon-detection circuitry (e.g., a current source configured to provide a bias current to the superconducting wire such that a predetermined intensity of photons incident on the superconducting wire (e.g., a single photon) causes the superconducting wire to transition from a superconducting state to a non-superconducting state, as well as circuitry to determine that the superconducting wire has transitioned from a superconducting state to a non-superconducting state in response to detection of the predefined intensity of photons).

In some embodiments, superconducting circuit 200 is used in a system that performs quantum operations (e.g., quantum computing operations such as quantum key distribution, quantum computing protocols based on teleportation, quantum communication, and the like). In some embodiments, the quantum operations are photonic quantum operations (e.g., quantum bits, or "qubits," are encoded in a state of one or more photons). In some embodiments, the superconducting wires 202 are nanowires and are not sensitive to photons used in quantum operations of the circuit (so as to not interfere with quantum operations and to prevent noise in the heat measurements).

Figure 2C:
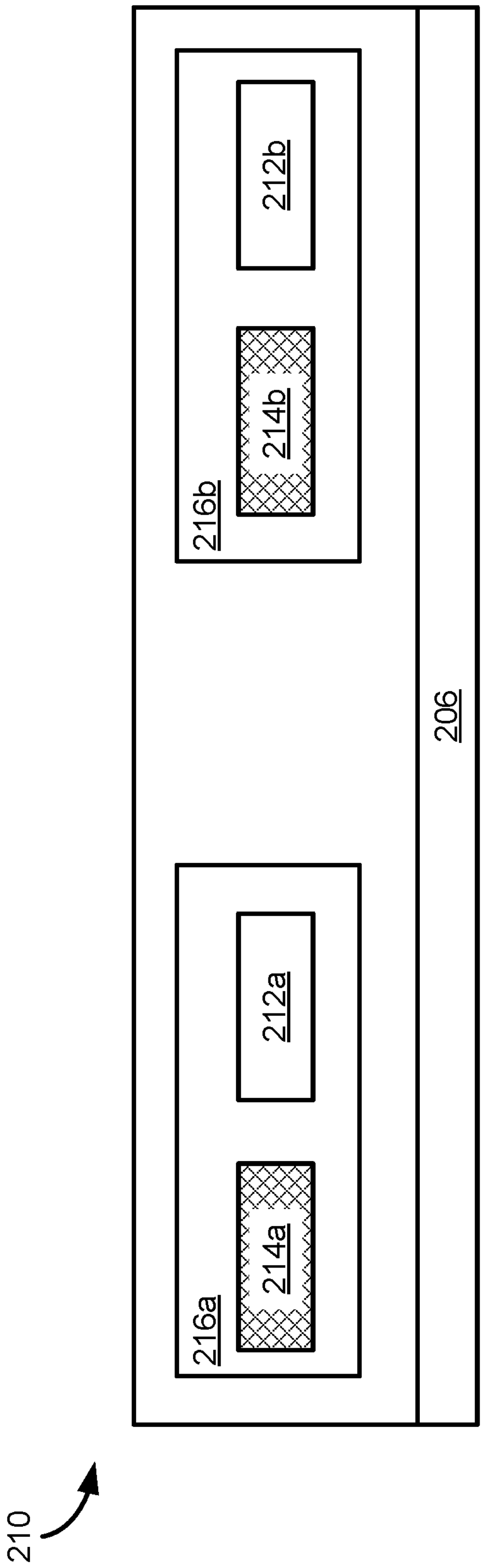

FIG. 2C is a diagram of a superconducting circuit 210, in accordance with some embodiments. In particular, FIG. 2C illustrates a vertical cross-section of the superconducting circuit 210.

In some embodiments, superconducting circuit 210 includes a plurality of sub-circuits 216 (e.g., sub-circuit 216*a* and sub-circuit 216*b*) analogous to superconducting circuit 200, described with reference to FIGS. 2A-2B, except that sub-circuits 216 need not include a plurality of superconducting wires (e.g., may include only one superconducting wire). In some embodiments, superconducting circuit 210 performs load balancing between the plurality of sub-circuits 216 based on the respective temperatures of the sub-circuits 216, as inferred from superconducting threshold temperatures.

To that end, sub-circuit 216*a* includes a first component 214*a* and a first superconducting wire 212*a*. The first component 214*a* is analogous to the first component 204*a* (FIGS. 2A-2B). The first superconducting wire 212*a* is analogous to any of the superconducting wires 202 (FIGS. 2A-2B). The first component 214*a* is configured to perform a particular operation (e.g., photon detection).

Sub-circuit 216*b* includes a second component 214*b* and a second superconducting wire 212*b*. The second component 214*b* is analogous to the first component 204*a* (FIGS. 2A-2B). The second superconducting wire 212*b* is analogous to any of the superconducting wires 202 (FIGS. 2A-2B). The second component 214*b* is also configured to perform the particular operation (e.g., the same operation).

The first superconducting wire 212*a* and the second superconducting wire 212*b* comprise a plurality of superconducting wires 212 that are positioned and configured to determine a first amount of heat generated by the first component 214*a* and a second amount of heat generated by the second component 214*b* (e.g., the first superconducting wire 212*a* is used to measure or infer the temperature of the first component 214*a* and the second superconducting wire 212*b* is used to measure or infer the temperature of the second component 214*b*, as described above).

To that end, in some embodiments, superconducting circuit 210 is electrically-coupled to control circuitry (e.g., control circuitry 606, FIG. 6) that is configured to provide current to each of the plurality of superconducting wires 212. In some embodiments, the control circuitry is also configured to determine the respective current at which the superconducting wire transitions between a superconducting state and a non-superconducting state. In some embodiments, the superconducting wires 212 are coupled to the control circuitry using contacts and/or vias, not shown. In some embodiments, at least a portion of the control circuitry is integrated on the same substrate as the superconducting wires 212. In some embodiments, the control circuitry is configured to selectively operate the first component 214*a* and the second component 214*b* (e.g., operate one or the other, but not both at the same time) based on the first and second amounts of heat measured from the first component 214*a* and the second component 214*b*, respectively (e.g., the first and second components 214 are redundant and the control circuitry operates the one that produces the least heat). As another example, the control circuitry disables, or slows operation of, the first or second component to allow for cooling (e.g., adjust load balancing between the components to allow for cooling).

In some embodiments, the first component 214*a* and the second component 214*b* are circuit components with temperature-dependent operating parameters. For example, in some embodiments, the first component 214*a* and the second component 214*b* comprise photon detection components. The photon detection components have respective detection efficiencies that are temperature-dependent.

Figure 3:
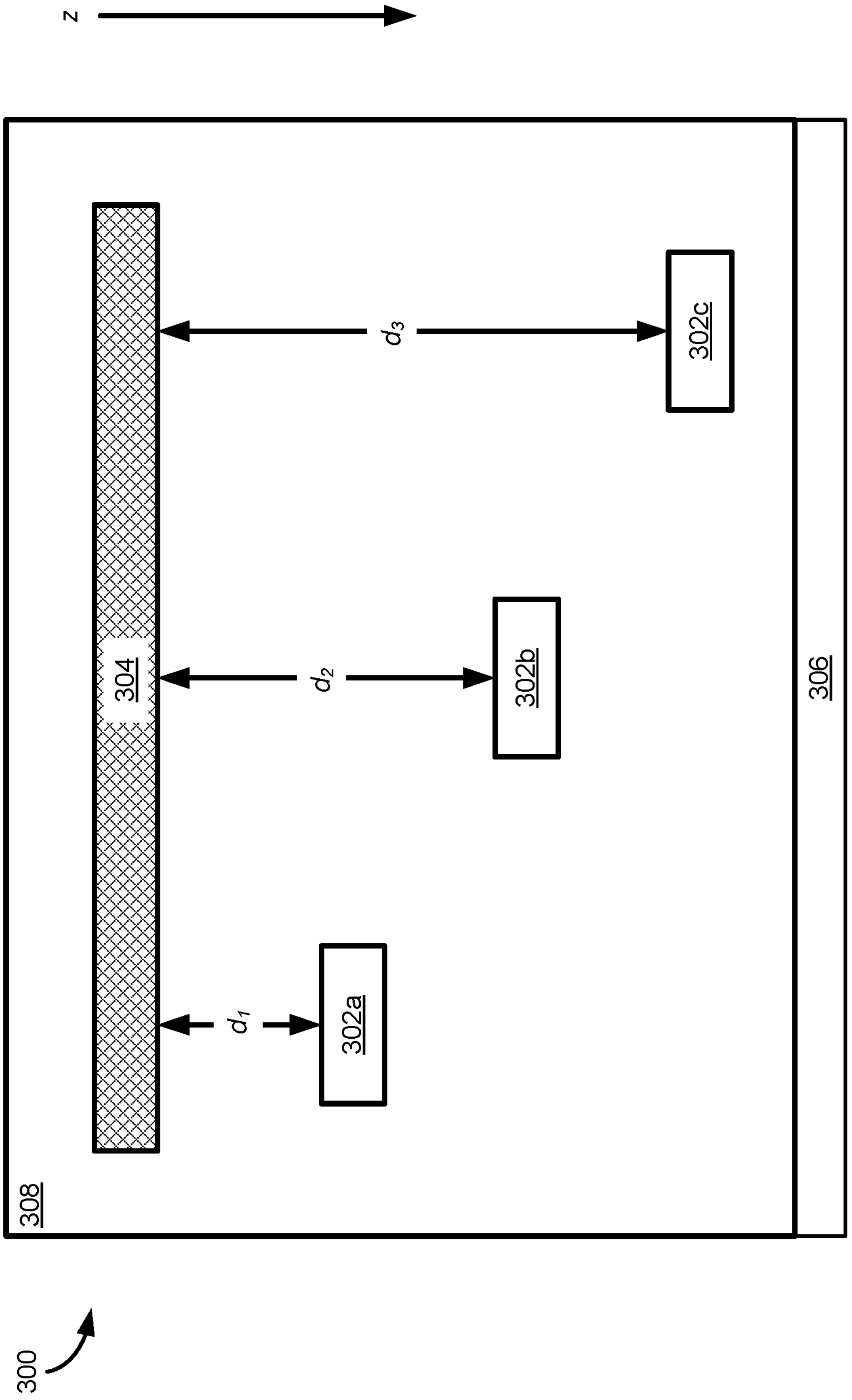
FIG. 3 is a diagram illustrating another superconducting circuit, in accordance with some embodiments.

FIG. 3 is a diagram illustrating a superconducting circuit 300, in accordance with some embodiments. In particular, FIG. 3 illustrates a vertical cross-section of the superconducting circuit 300.

Superconducting circuit 300 includes a first component 304 (analogous to first component 204, FIGS. 2A-2B) and a plurality of superconducting wires 302 (analogous to superconducting wires 202, FIGS. 2A-2B). The superconducting circuit 300 is disposed on a substrate 306 (analogous to substrate 206, FIGS. 2A-2B). The plurality of superconducting wires 302 are separated from one another (e.g., each other superconducting wire 302) by a dielectric material 308 (analogous to dielectric material 208, FIGS. 2A-2B). In some embodiments, a superconducting wire 302 nearest the first component 304 among the plurality of superconducting wires (e.g., superconducting wire 302*a*) is more than a phonon mean free path of the dielectric material from the first component. Furthermore, in some embodiments, the plurality of superconducting wires 302 are separated from one another by more than a mean free path of phonons (and/or electrons) in the dielectric material 308.

In some embodiments, each superconducting wire of the plurality of superconducting wires 302 is a distinct distance from the first component 304. In some embodiments, the first component 304 is stacked with the dielectric material 308 and the superconducting wires 302 are at different depths from the first component 304 within the dielectric material 308. For example, a first superconducting wire 302*a* is disposed at a first depth $d_1$ relative to the first component 304 (e.g., and thus separated from the first component 304 by the first depth $d_1$). A second superconducting wire 302*b* is disposed at a second depth $d_2$ relative to the first component 304 (e.g., and thus separated from the first component 304 by the second depth $d_2$). A third superconducting wire 302*c* is disposed at a third depth $d_3$ relative to the first component 304 (e.g., and thus separated from the first component 304 by the third depth $d_3$). The first, second, and third depths are all different depths.

In some embodiments, the plurality of superconducting wires are disposed at different horizontal positions (e.g., as shown in FIG. 3, with FIG. 3 illustrating a horizontal cross-section of the superconducting circuit 300 instead of a vertical cross-section) relative to the first component 304.

Figure 4:
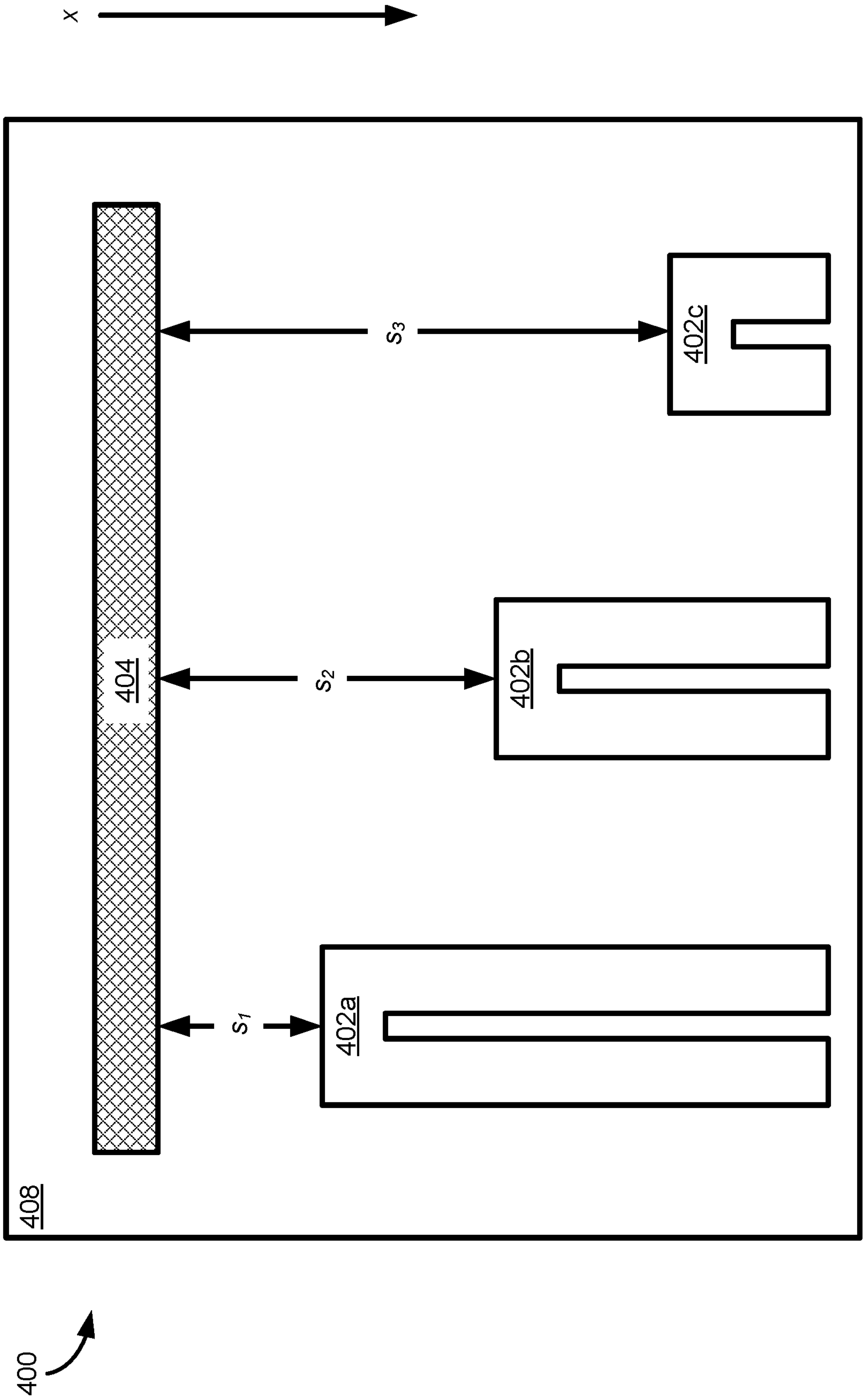
FIG. 4 is a diagram illustrating another superconducting circuit, in accordance with some embodiments.

FIG. 4 is a diagram illustrating a superconducting circuit 400, in accordance with some embodiments. In particular, FIG. 4 illustrates a horizontal cross-section of the superconducting circuit 400.

Superconducting circuit 400 includes a first component 404 (analogous to first component 204, FIGS. 2A-2B) and a plurality of superconducting wires 402 (analogous to superconducting wires 202, FIGS. 2A-2B). The superconducting circuit 400 is disposed on a substrate (not shown, since the view is a horizontal view, but analogous to substrate 206, FIGS. 2A-2B). In some embodiments, the plurality of superconducting wires 402 are separated from one another by a dielectric material 408 (analogous to dielectric material 208, FIGS. 2A-2B). In some embodiments, a superconducting wire 402 nearest the first component 404 among the plurality of superconducting wires (e.g., superconducting wire 402*a*) is more than a phonon mean free path of the dielectric material from the first component. In some embodiments, the plurality of superconducting wires 402 are separated from one another by more than a mean free path of phonons (and/or electrons) in the dielectric material 408.

In some embodiments, each superconducting wire of the plurality of superconducting wires 402 is a distinct distance from the first component 404. In some embodiments, the plurality of superconducting wires 402 are on a same horizontal plane (e.g., at the same depth). In some embodiments, each superconducting wire 402 of the plurality of superconducting wires comprises a distinct instance of a same layer deposited on the substrate. For example, a first superconducting wire 402*a* has a closest portion separated by a first distance $s_1$ from the first component 404 (e.g., and thus is separated from the first component 404 by the first distance $s_1$). A second superconducting wire 402*b* has a closest portion separated by a second distance $s_2$ from the first component 404 (e.g., and thus is separated from the first component 404 by the second distance $s_2$). A third superconducting wire 402*b* has a closest portion separated by a third distance $s_3$ from the first component 404 (e.g., and thus is separated from the first component 404 by the third distance $s_3$). The first, second, and third distances are all different distances.

Figure 5:
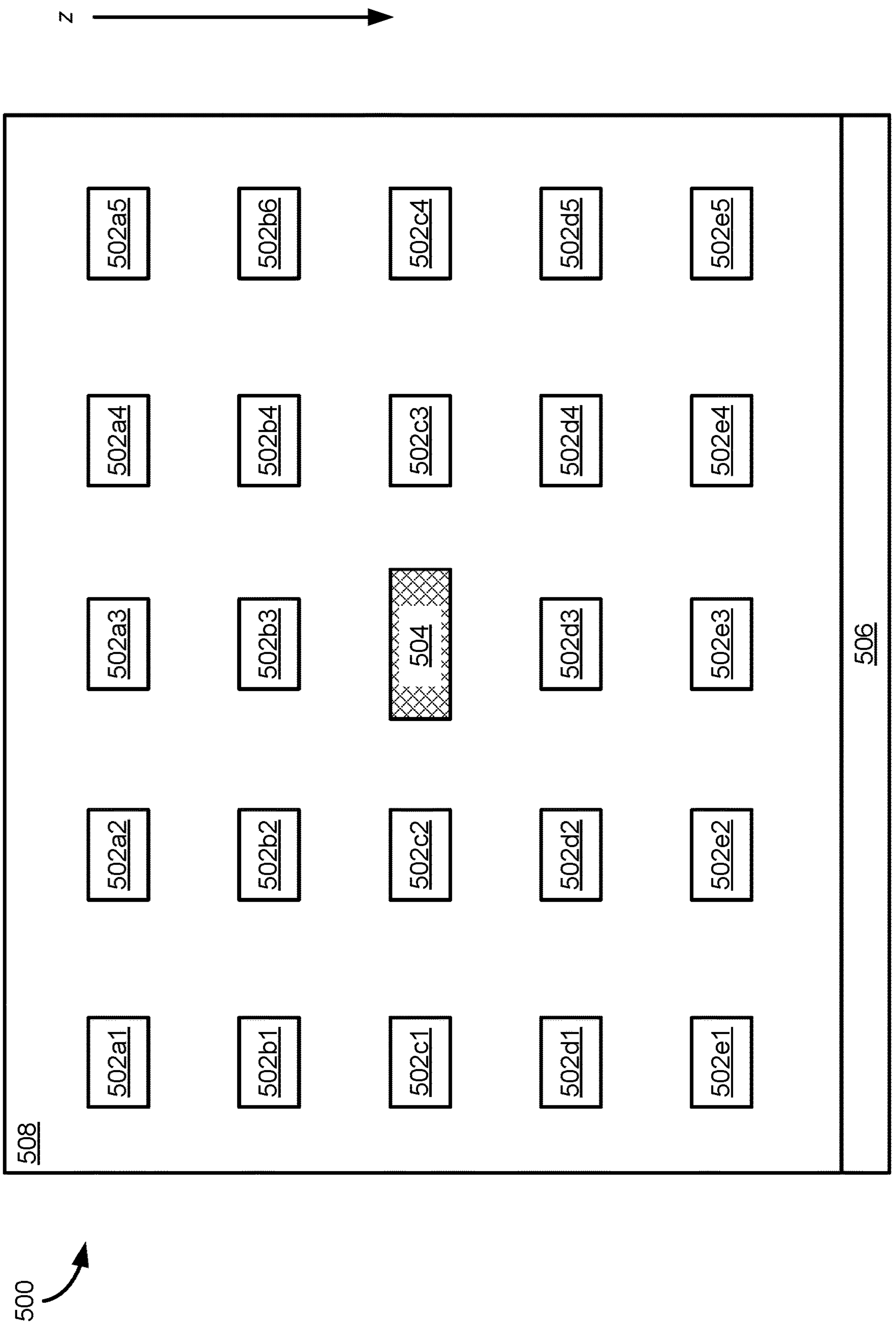
FIG. 5 is a diagram illustrating a superconducting circuit for generating a heat map, in accordance with some embodiments.

FIG. 5 is a diagram illustrating a superconducting circuit 500 for generating a heat map, in accordance with some embodiments. In particular, FIG. 5 illustrates a vertical cross-section of the superconducting circuit 500.

Superconducting circuit 500 includes a first component 504 (analogous to first component 204, FIGS. 2A-2B) and a plurality of superconducting wires 502 (analogous to superconducting wires 202, FIGS. 2A-2B). The superconducting circuit 500 is disposed on a substrate 506 (analogous to substrate 206, FIGS. 2A-2B). The plurality of superconducting wires 502 are separated from one another by a dielectric material 508 (analogous to dielectric material 208, FIGS. 2A-2B). In some embodiments, a superconducting wire 502 nearest the first component 504 (e.g., any of superconducting wire 502*b*3; 503*c*2; 502*c*3; and 502*d*3) among the plurality of superconducting wires is more than a phonon mean free path of the dielectric material from the first component. In some embodiments, the plurality of superconducting wires 502 are separated from one another (e.g., each other superconducting wire 502) by more than a mean free path of phonons (and/or electrons) in the dielectric material 508. In some embodiments, each superconducting wire of the plurality of superconducting wires 504 has a same surface area (e.g., to remove size-dependent variables from the heat mapping and cancel out contact resistances).

In some embodiments, the plurality of superconducting wires 502 includes one or more sets of superconducting wires arranged on a same plane at varying horizontal distances from the first component 504. For example, superconducting wires 502*a*1-502*a*5 comprise a set of superconducting wires arranged on the same plane (e.g., all having the same z-axis value) at varying horizontal distances from the first component 504. Superconducting wires 502*b*1-502*b*5 also comprise a set of superconducting wires arranged on the same horizontal plane (but different from the horizontal plane for superconducting wires 502*a*1-502*a*5) at varying horizontal distances from the first component 504, as do superconducting wires 502*c*1-502*c*4, as do superconducting wires 502*d*1-502*d*5, as do superconducting wires 502*e*1-502*e*5.

The plurality of superconducting wires 502 includes one or more sets of superconducting wires arranged at varying vertical distances from the first component 504. Note that the sets of superconducting wires arranged at varying vertical distances from the first component 504 may include some of the same superconducting wires as the sets of superconducting wires arranged at varying horizontal distances from the first component 504. For example, superconducting wires 502*a*1, 502*b*1, 502*c*1, 502*d*1 and 502*e*1 comprise a set of superconducting wires arranged in the same vertical plane at varying vertical distances from the first component 504 (as do superconducting wires 502*a*2, 502*b*2, 502*c*2, 502*d*2 and 502*e*2, and so on).

Data from the superconducting wires 502 (e.g., the measured threshold superconducting currents and/or the inferred temperatures) can be used to generate a three-dimensional (3D) heat map, which can be used to probe or calibrate the thermal properties of the device (e.g., the thermal properties of the dielectric material 508, the substrate 506, and/or the heat generating properties of the first component 504). In some embodiments, the various devices and circuits described herein can be used to generate a two-dimensional (2D) heat map instead (e.g., using superconducting circuit 200 and/or superconducting circuit 300).

Figure 6:
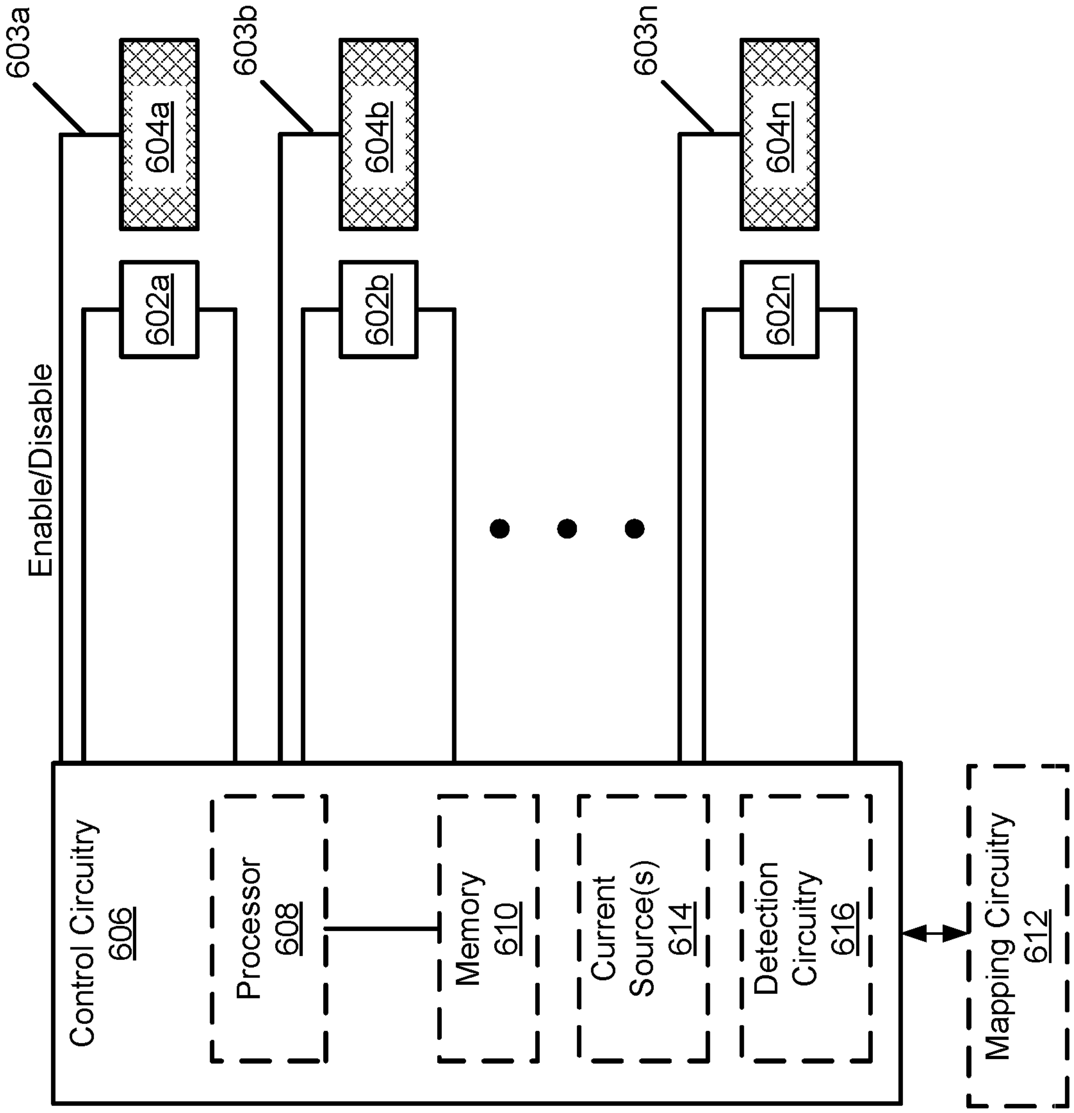
FIG. 6 is a schematic diagram illustrating an electronic device that performs load balancing on a plurality of circuits based on their respective temperatures, in accordance with some embodiments.

FIG. 6 is a schematic diagram illustrating an electronic device 600 that performs load balancing on a plurality of circuits based on their respective temperatures, in accordance with some embodiments. In some embodiments, in addition or as an alternative to load balancing, FIG. 6 illustrates an electronic device with multi-use components (e.g., components that both measure and/or monitor the temperature of the electronic device 600 and also detect photons).

Electronic device 600 includes a plurality of components 604 (e.g., components 604*a*-604*n*, each analogous to first component 204, FIGS. 2A-2B) and a plurality of superconducting wires 602 (e.g., components 602*a*-602*n*, analogous to superconducting wires 202, FIGS. 2A-2B). Electronic device 600 further includes control circuitry 606 electrically-coupled to the plurality of superconducting wires 602 and configured to provide current to each of the plurality of superconducting wires 602.

In some embodiments, the control circuitry 606 is further configured to determine a respective current at which each superconducting wire 602 transitions between a superconducting state and a non-superconducting state. In some embodiments, the control circuitry 606 is further configured to determine whether the superconducting wire 602 transitions from a non-superconducting state to a superconducting state in response to being supplied with a particular current. In some embodiments, the control circuitry 606 is configured, or further configured, to determine whether the superconducting wire 602 transitions from a superconducting state to a non-superconducting state in response to being supplied with a particular current.

For example, the control circuitry 606 supplies a first current to each superconducting wire 602 (e.g., in parallel)

and, if the superconducting wire 602 does not transition while supplied with the first current, the control circuitry 606 operates, or outputs a result signal/value, in accordance with the measured temperature of the component 604 being below a threshold temperature because the component 604 is inferred to be operating at a temperature below the superconducting threshold temperature. As another example, the control circuitry 606 steps up (or down) (e.g., iteratively) the supplied current and determines the current at which each superconducting wire transitions.

In some embodiments, each of the plurality of components 604 is configured to perform a particular operation (e.g., the components 604 are redundant components that perform, or are capable of performing, the same operation), and the control circuitry 606 performs load balancing between the components 604. For example, one or more (or each) of the plurality of components 604 is a photon detection component that has a temperature-dependent detection efficiency. Note that, in some embodiments, components 604 and superconducting wires 602 are analogous components (e.g., both components 604 and superconducting wires 602 are superconducting components of one or more photon detectors). To that end, in some embodiments, the control circuitry 606 includes photon-detection control circuitry (e.g., one or more current source(s) 614 configured to provide a bias current to the components 604 (e.g., superconducting wires) such that a predetermined intensity of photons incident on the component 604 (e.g., a single photon) causes the component 604 to transition from a superconducting state to a non-superconducting state, as well as detection circuitry 616 to determine that the superconducting wire has transitioned from a superconducting state to a non-superconducting state in response to detection of the predefined intensity of photons).

Further, each of the plurality of superconducting wires 602 is positioned and configured to determine an amount of heat generated by a respective component 604. The control circuitry 606 is configured to selectively operate the respective component 604 (e.g., instead of the other components 604) based on the amount of heat generated by the respective component 604. As another example, the control circuitry 606 slows the operation of hotter components 604 to adjust load balancing of the components 604 and allow for cooling.

For example, the control circuitry 606 is configured to provide a respective enable/disable signal 603 (e.g., enable/disable signals 603*a*-603*n*) to each component 604 to turn on an off the component 604 depending on the amount of heat generated by the component 604. In some embodiments, each enable/disable signal 603 operates a switch that couples the respective component 604 to external electrical and/or optical circuitry when the enable/disable signal 603 is in an "on" (e.g., enable) state and decouples the respective component 604 from the electrical and/or optical external circuitry when the enable/disable signal 603 is in an "off" (e.g., disable) state. For example, the enable/disable signal 603 operates an optical switch that couples/decouples the respective component 604 from a waveguide, thus enabling or disabling the respective component 604 from detecting photons in the waveguide.

In some embodiments, the control circuitry 606 includes one or more processors 608. In some embodiments, the one or more processors 608 include logic for performing the operations described above (e.g., the one or more processors 608 comprise field programmable gate arrays (FPGAs) or application-specific integrated circuits (ASICs). In some embodiments, the one or more processors 608 comprise central processing units (CPUs) or general processing units (GPUs). In some embodiments, the control circuitry 606 includes memory 610 storing one or more programs for execution by the one or more processors 608. The one or more programs include instructions for performing any of the operations described above.

In some embodiments, electronic device 600 includes mapping circuitry 612 configured to generate a heat map for heat produced by the one or more components 604 based on data from superconducting wires 602, as explained with reference to FIG. 5.

Figure 7:
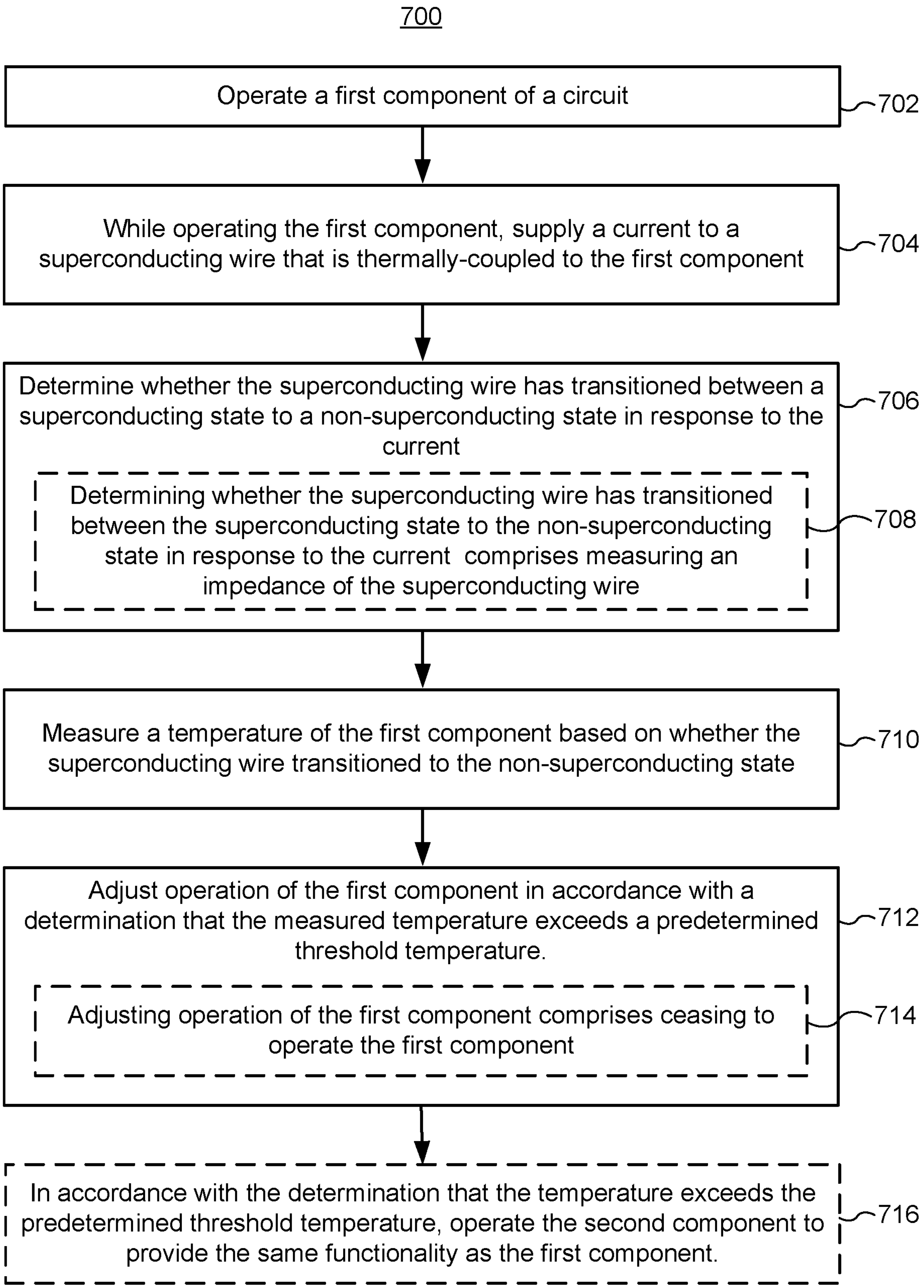
FIG. 7 is a flowchart for a method of adjusting operation of circuit components based on temperature, in accordance with some embodiments.

FIG. 7 is a flowchart for a method 700 of adjusting operation of a circuit component, based on temperature, in accordance with some embodiments. In some embodiments, method 700 is performed at an electronic device (e.g. electronic device 600, FIG. 6). In some embodiments, method 700 is performed by one or more processors without human intervention. In some embodiments, the one or more processors include logic for performing the operations of method 700 (e.g., the one or more processors comprise FPGAs or ASICs). In some embodiments, the electronic device includes memory storing one or more programs for execution by the one or more processors. The one or more programs include instructions for performing the operations of method 700.

Method 700 includes operating (702) a first component of a circuit. In some embodiments, the circuit is a component of the electronic device that performs method 700. In some embodiments, the first component is a photon detection component (e.g., an SNSPD). In some embodiments, operating the first component includes detecting photons with the first component. In some embodiments, the first component is configured to perform a particular operation that has a temperature dependent efficiency. For example, the first component is a photon detection component that has a detection efficiency that is temperature-dependent. Components 204, 214, 304, 404, 504, and 604, described supra, are all examples of suitable first components.

Method 700 includes, while operating the first component, supplying (704) a current to a superconducting wire that is thermally-coupled to the first component. Superconducting wires 202, 212, 302, 402, 502, and 602, described supra, are all examples of suitable superconducting wires.

Method 700 includes determining (706) whether the superconducting wire has transitioned between a superconducting state to a non-superconducting state in response to the current. In some embodiments, determining whether the superconducting wire has transitioned between the superconducting state to the non-superconducting state in response to the current comprises measuring (708) an impedance of the superconducting wire. For example, when the impedance of the superconducting wire is zero (e.g., once the contact resistance has been accounted for), it can be inferred that the superconducting wire is in the superconducting state. When the impedance of the superconducting wire is not zero, it can be inferred that the superconducting wire is in the non-superconducting state.

In some embodiments, method 700 includes iteratively performing operation 704 and operation 706 to determine a threshold superconducting current for the first component. In some embodiments, the threshold superconducting current is a hotspot current. In some embodiments, the threshold superconducting current is a critical current. Hotspot currents and critical currents are described with reference to FIG. 1.

Method 700 includes measuring (710) (e.g., inferring) a temperature of the first component based on whether the superconducting wire transitioned to the non-superconducting state. For example, the lowest current that causes the state change from superconducting to non-superconducting is mapped to the current (measured) temperature, using a lookup table or predefined equation (linear or non-linear)).

Method 700 includes adjusting (712) operation of the first component in accordance with a determination that the measured temperature exceeds a predetermined threshold temperature. In some embodiments, adjusting operation of the first component comprises ceasing (714) to operate the first component. In some embodiments, the predetermined threshold temperature corresponds to a predetermined acceptable efficiency.

In some embodiments, method 700 includes, in accordance with the determination that the temperature exceeds the predetermined threshold temperature, operating (716) the second component to provide the same functionality as the first component (e.g., as described with reference to FIG. 6). In some embodiments, operating the second component to provide the same functionality as the first component comprises balancing a load (e.g., of the operation) between the two components (e.g., based on the two components' respective temperatures).

In some embodiments, a method is provided for characterizing the thermal properties of a device (e.g., any of the device described herein). The method includes operating a first component of a circuit. The method further includes, while operating the first component, supplying a current to a superconducting wire that is thermally-coupled to the first component. The method further includes determining whether the superconducting wire has transitioned between a superconducting state to a non-superconducting state in response to the current. The method further includes measuring (e.g., inferring) a thermal property of the device based on whether the superconducting wire transitioned between the superconducting state to the non-superconducting state in response to the current. In some embodiments, the thermal property is a thermal property (e.g., thermal conductivity) of a dielectric material separating the first component from the superconducting wire (e.g., dielectric material 208, FIG. 2). In some embodiments, multiple superconducting wires (e.g., arranged in a 2D structure, such as in FIG. 4, or a 3D structure, such as in FIG. 5) are used obtain additional information about the thermal property, or for generating a 2D or 3D map of the thermal property and/or temperature in the device. For example, the thermal property and/or temperature is measured at various locations within or around the device to characterize the uniformity of the thermal property and/or improve the signal-to-noise ratio of the thermal property.

It will also be understood that, although the terms first, second, etc. are, in some instances, used herein to describe various elements, these elements should not be limited by these terms. These terms are only used to distinguish one element from another. For example, a first current could be termed a second current, and, similarly, a second current could be termed a first current, without departing from the scope of the various described embodiments. The first current and the second current are both currents, but they are not the same condition unless explicitly stated as such.

The terminology used in the description of the various described embodiments herein is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

The foregoing description, for purpose of explanation, has been described with reference to specific embodiments. However, the illustrative discussions above are not intended to be exhaustive or to limit the scope of the claims to the precise forms disclosed. Many modifications and variations are possible in view of the above teachings. The embodiments were chosen in order to best explain the principles underlying the claims and their practical applications, to thereby enable others skilled in the art to best use the embodiments with various modifications as are suited to the particular uses contemplated.

What is claimed is:

1. A method, comprising:

operating a first component of a circuit and a second component of the circuit;

while operating the first component, supplying a current to a set of superconducting wires that is thermally-coupled to the first component, wherein the set of superconducting wires comprises respective subsets of superconducting wires arranged on at least three different sides of the first component;

determining whether each superconducting wire in the set of superconducting wires has transitioned from a superconducting state to a non-superconducting state in response to the current;

generating a multi-dimensional heat map for heat produced by the first component based on which superconducting wires in the set of superconducting wires have transitioned from the superconducting state to the non-superconducting state in response to the current; and adjusting operation of the first component based on the multi-dimensional heat map, wherein adjusting operation of the first component comprises performing load balancing between the first component and the second component in accordance with a temperature of the first component.

2. The method of claim 1, wherein the second component has a same functionality as the first component.

3. The method of claim 1, wherein determining whether a respective superconducting wire of the set of superconducting wires has transitioned from the superconducting state to the non-superconducting state in response to the current comprises measuring an impedance of the respective superconducting wire.

4. The method of claim 2, further comprising:

while operating the second component, measuring a second temperature for the second component; and adjusting operation of the second component in accordance with a determination that the second temperature exceeds the predetermined threshold temperature.

5. The method of claim 1, further comprising determining a current threshold at which a respective superconducting wire of the set of superconducting wires transitions between the superconducting state and the non-superconducting state.

6. The method of claim 5, wherein the current threshold is determined by iteratively adjusting a supply current for the respective superconducting wire.

7. The method of claim 1, wherein the multi-dimensional heat map is a three-dimensional heat map.

8. The method of claim 1, wherein the first component comprises a non-superconducting component.

9. The method of claim 1, wherein the first component comprises a superconducting component that produces heat when operating in the non-superconducting state.

10. The method of claim 1, wherein the set of superconducting wires includes a second superconducting wire that is thermally coupled to the first components, and the method further comprises supplying a second current to the second superconducting wire that is thermally coupled to the first component, wherein generating the multi-dimensional heat map is further based on whether the second superconducting wire has transitioned between the superconducting state to the non-superconducting state in response to the second current.

11. The method of claim 1, wherein the set of superconducting wires comprises respective superconducting wires positioned at different distances from the first component.

12. The method of claim 1, wherein respective superconducting wires of the set of superconducting wires have a same surface area.

13. The method of claim 1, wherein respective superconducting wires of the set of superconducting wires are positioned on a same horizontal plane.

14. The method of claim 1, wherein respective superconducting wires of the set of superconducting wires are arranged to be further than a phonon mean free path from one another.

15. The method of claim 1, further comprising detecting one or more photons incident to the set of superconducting wires.

16. The method of claim 1, further comprising detecting one or more photons incident to a photon detection component electrically coupled to the set of superconducting wires.

17. The method of claim 1, wherein the first component operates with one or more temperature-dependent operating parameters.

18. The method of claim 1, wherein adjusting the operation of the first component comprises slowing operation of the first component.

19. The method of claim 1, further comprising:

determining a temperature of the first component based on the multi-dimensional heat map; and calibrating one or more thermal properties of the circuit based on the temperature of the first component.

* * * * *